US006355997B1

(12) United States Patent
Hao

(10) Patent No.: US 6,355,997 B1
(45) Date of Patent: Mar. 12, 2002

(54) SWITCH FOR A VARIABLE-SPEED INDUCTION MOTOR

(76) Inventor: Chung-Hsing Hao, No. 22-2, Sec. 2, Chang-An Rd., Hsi-Tun Dist., Taichung City (TW)

( * ) Notice: Subject to any disclaimer, the term of this patent is extended or adjusted under 35 U.S.C. 154(b) by 23 days.

(21) Appl. No.: 09/629,505

(22) Filed: Jul. 31, 2000

(51) Int. Cl.[7] .......................... H02H 35/10; H02H 9/04; H02H 9/00

(52) U.S. Cl. ................ 310/68 E; 200/80 R; 200/302.1; 361/828

(58) Field of Search ................................ 310/68 R, 69, 310/71, 68 A, 68 E; 439/67, 610, 607, 620; 29/603.14, 603.15, 877; 200/80 R, 293, 302.1

(56) References Cited

U.S. PATENT DOCUMENTS 4,386,290 A * 5/1983 Monette .................... 310/68 E
4,504,710 A * 3/1985 Bryant et al. ............. 310/68 E
4,686,401 A * 8/1987 Gehrt ......................... 310/68 E
4,922,066 A * 5/1990 Crow et al. ............... 200/80 R
4,927,988 A * 5/1990 Nolte ......................... 310/68 E
5,266,761 A * 11/1993 Fisher et al. ............. 200/302.1
5,377,082 A * 12/1994 Fisher et al. .............. 310/68 A

* cited by examiner

*Primary Examiner*—Tran Nguyen
(74) *Attorney, Agent, or Firm*—Christensen O'Connor Johnson Kindness PLLC

(57) ABSTRACT

A switch includes a casing having a pair of first conductive connecting pieces, a rotary member having a plurality of second conductive connecting pieces, and a switching electrical circuit having a plurality of conductive traces. The second conductive connecting pieces selectively bridge the conductive traces to obtain a plurality of combinations of electrical connections for the switching electrical circuit. A driving member has a third conductive connecting piece and a tongue. The driving member is movable between a first position, in which the third conductive connecting piece interconnects the first conductive connecting pieces, and a second position, in which the third conductive connecting piece disconnects the first conductive connecting pieces. The tongue turns the rotary member a pitch of the latter each time the driving member moves from the first position to the second position. An urging unit urges the driving member to move from the second position to the first position.

3 Claims, 9 Drawing Sheets

SWITCH FOR A VARIABLE-SPEED INDUCTION MOTOR

BACKGROUND OF THE INVENTION

1. Field of the Invention

This invention relates to a switch for a variable-speed induction motor, particularly to a switch for a variable-speed induction motor of an electrical fan.

2. Description of the Related Art

Variable-speed induction motors for electrical devices, such as electric fans, are normally classified into two types, namely capacitor motor and tapped winding motor. A capacitor motor is generally noiseless upon varying the speed thereof. However, it is expensive, and tends to generate a large amount of heat during the operation of the motor. A tapped winding motor normally includes an electrical circuit board having a plurality of spaced apart conductive traces connected respectively to a plurality of coils, and a turnable rotary member with a plurality of spaced apart conductive connecting pieces which selectively bridge to the conductive traces by turning the rotary member. The rotation of the rotary member varies the points of contact of the conductive connecting pieces on the conductive traces of the electrical circuit board, thereby resulting in a plurality of possible combinations of electrical connections of the electrical circuit board with the coils for varying the speed of the motor. However, there is a tendency to generate noise due to a non-uniform magnetic line distribution formed between the charged coils upon varying the speed of the motor. Moreover, an electrical arc is not only generated between the conductive connecting pieces and the conductive traces at the very beginning of the rotation of the rotary member, but also during the course of the rotation of the rotary member.

SUMMARY OF THE INVENTION

Therefore, the object of the present invention is to provide a switch for a variable-speed induction motor that is capable of overcoming the aforementioned problems.

According to the present invention, a switch for a variable-speed induction motor comprises: a casing having a pair of spaced apart first conductive connecting pieces, one of the first conductive connecting pieces being adapted to be connected to a power supply; a rotary member disposed below and mounted rotatably on the casing for turning about an axis, and having a toothed part, and a plurality of spaced apart second conductive connecting pieces secured to a bottom side thereof; a switching electrical circuit adapted to be connected to the induction motor, disposed below the second conductive connecting pieces, and having a plurality of spaced apart conductive traces connected to the other one of the first conductive connecting pieces, the second conductive connecting pieces selectively bridging the conductive traces by turning the rotary member about the axis to obtain a plurality of combinations of electrical connections for the switching electrical circuit to vary the speed of the induction motor; a driving member mounted movably on the casing, and having a third conductive connecting piece projecting toward the first conductive connecting pieces, and a tongue projecting toward the toothed part, the driving member being movable between a first position, in which the third conductive connecting piece interconnects the first conductive connecting pieces to permit the switching electrical circuit to be connected electrically to the power supply, and a second position, in which the third conductive connecting piece disconnects the first conductive connecting pieces, thereby disconnecting the switching electrical circuit from the power supply, the tongue engaging the toothed part and turning the rotary member a pitch of the toothed part each time the driving member moves from the first position to the second position; and an urging unit for urging the driving member to move from the second position to the first position.

BRIEF DESCRIPTION OF THE DRAWINGS

In drawings which illustrate an embodiment of the invention.

DETAILED DESCRIPTION OF THE PREFERRED EMBODIMENT

Figure 1:
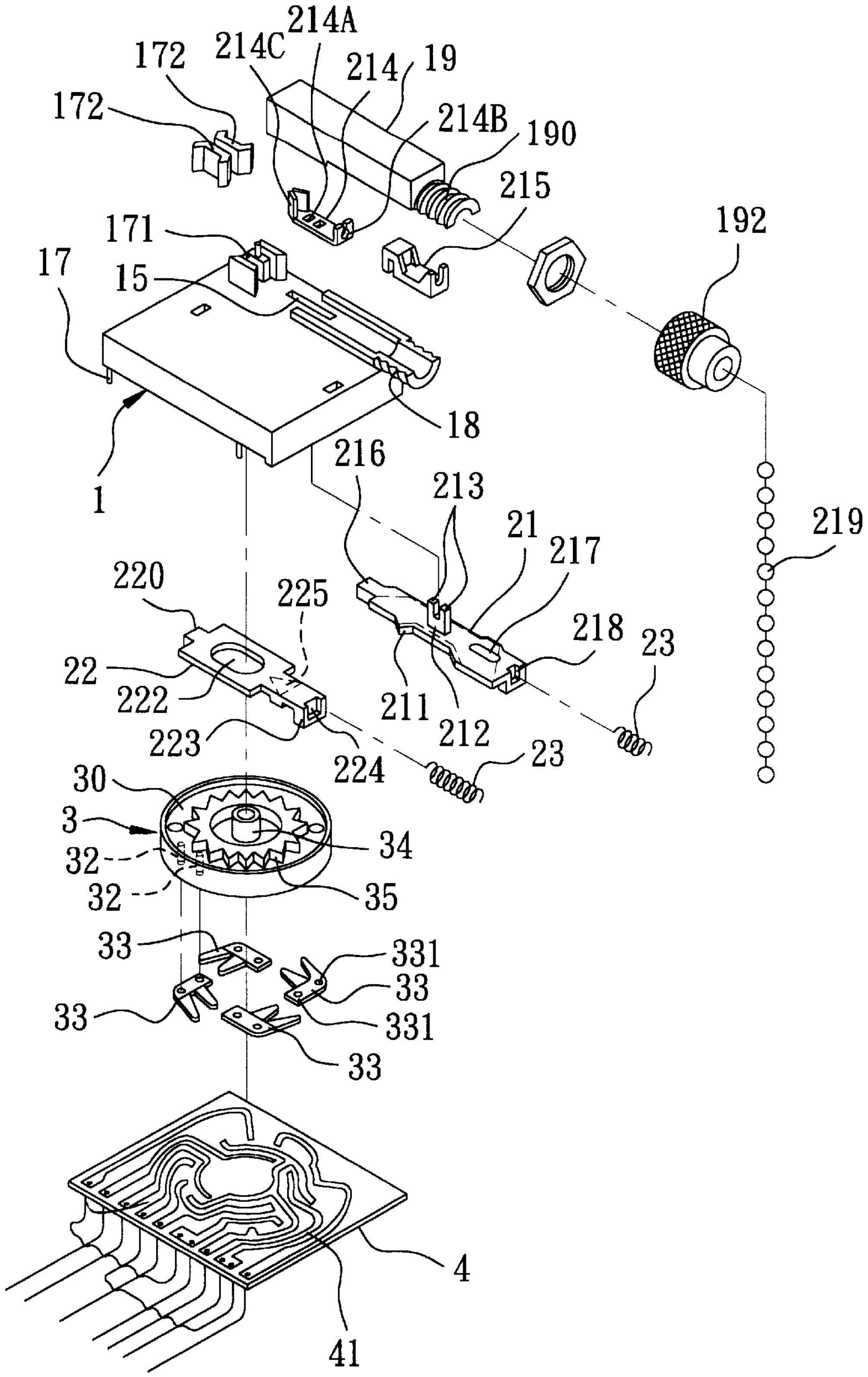
FIG. 1 is an exploded view of a switch embodying this invention for controlling an electrical device.
Figure 2:
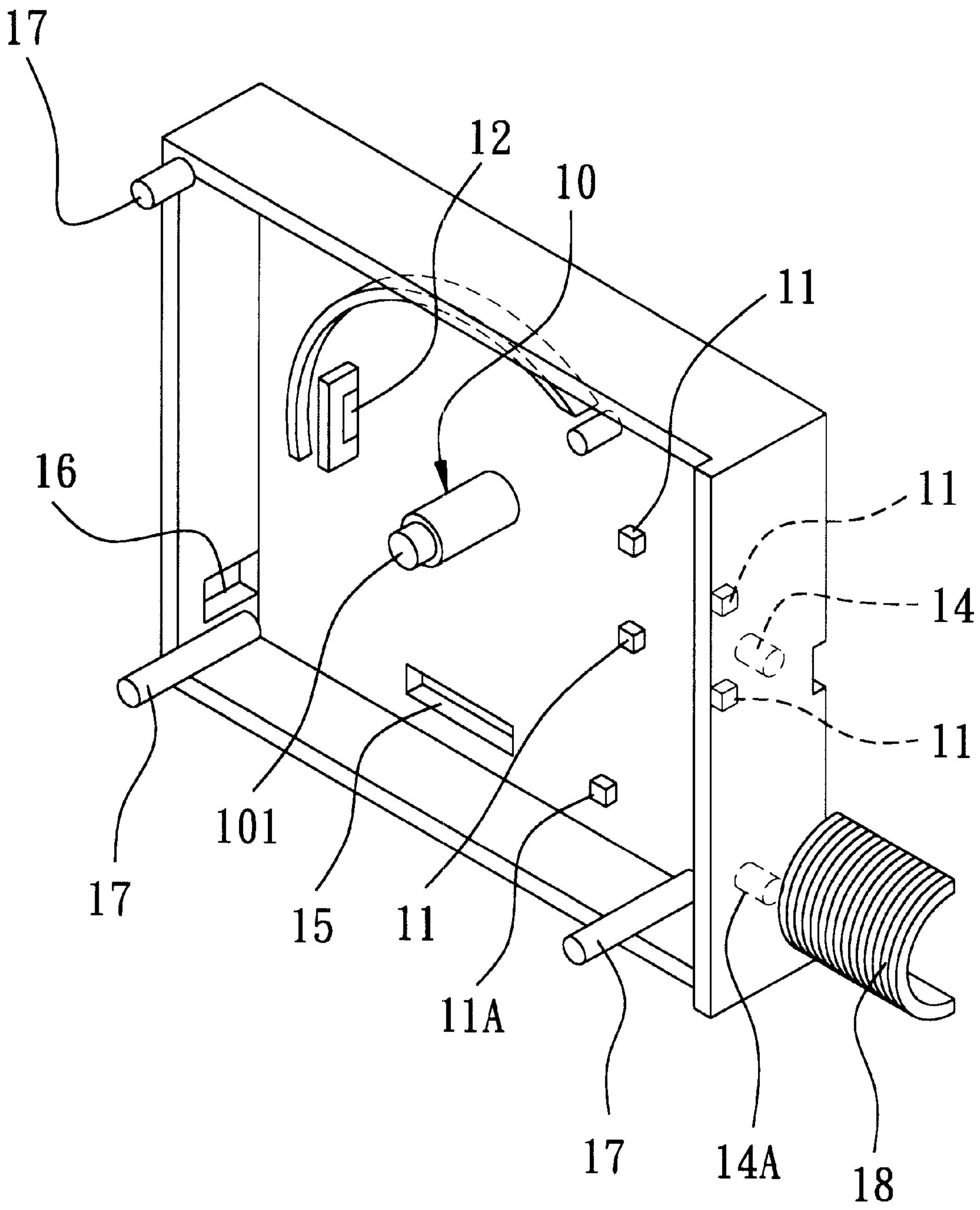
FIG. 2 is a perspective view of a casing of the switch of FIG. 1.
Figure 3:
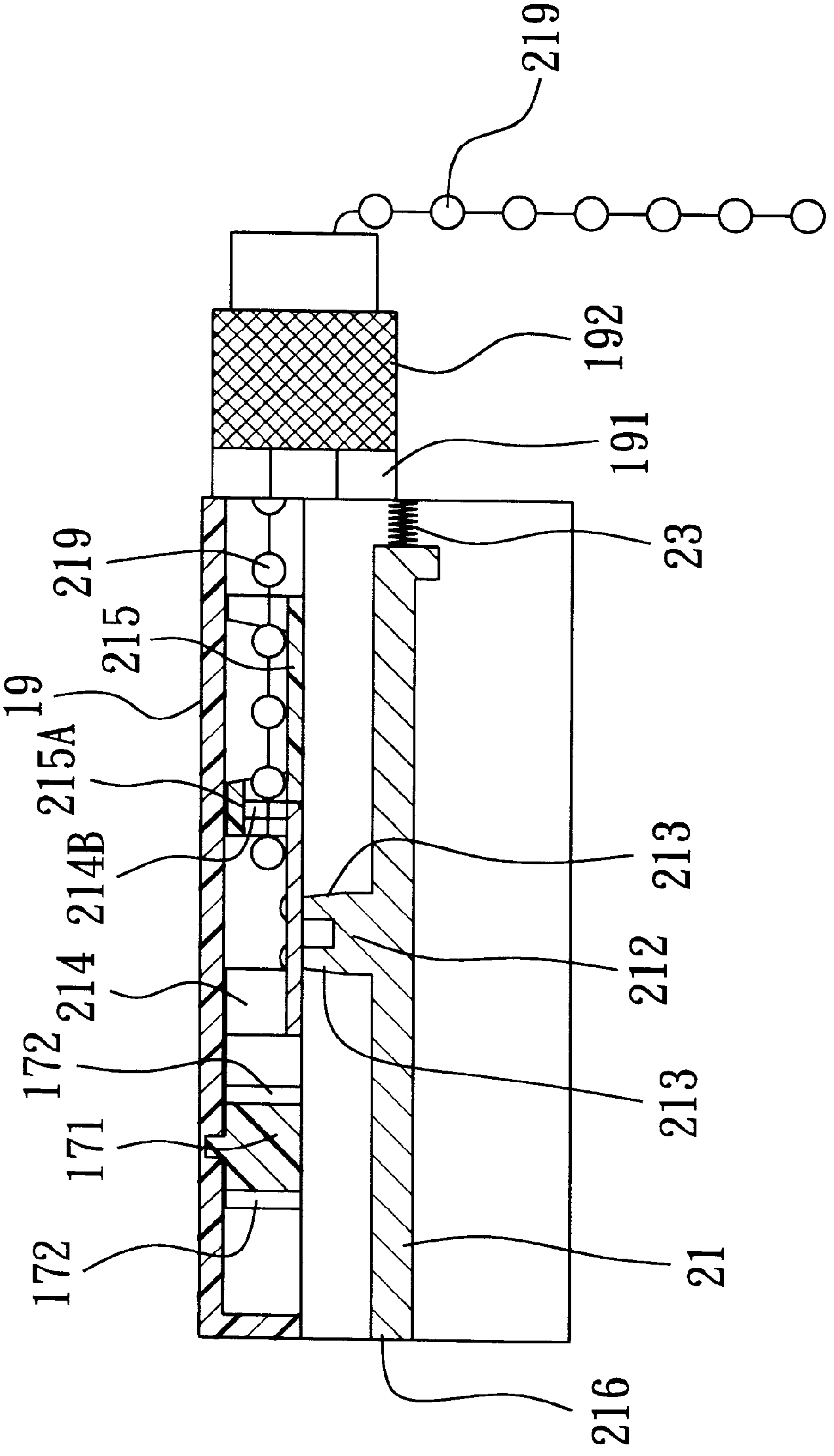
FIG. 3 is a cross-sectional side view of a driving member in contact with a pair of conductive connecting pieces of the switch of FIG. 1.
Figure 4:
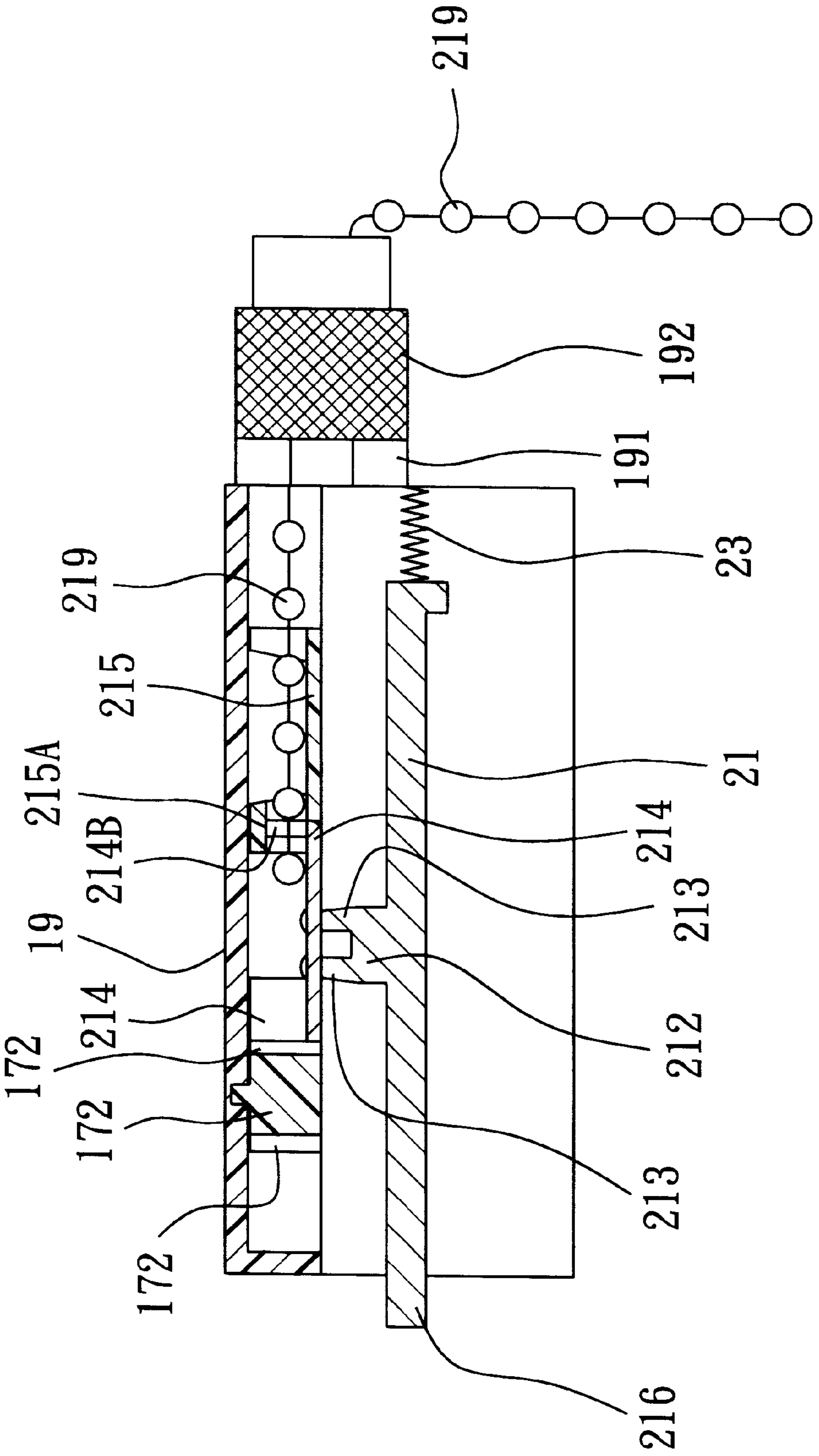
FIG. 4 is a cross-sectional side view of the driving member when moved away from the conductive connecting pieces of the switch of FIG. 1.
Figure 5:
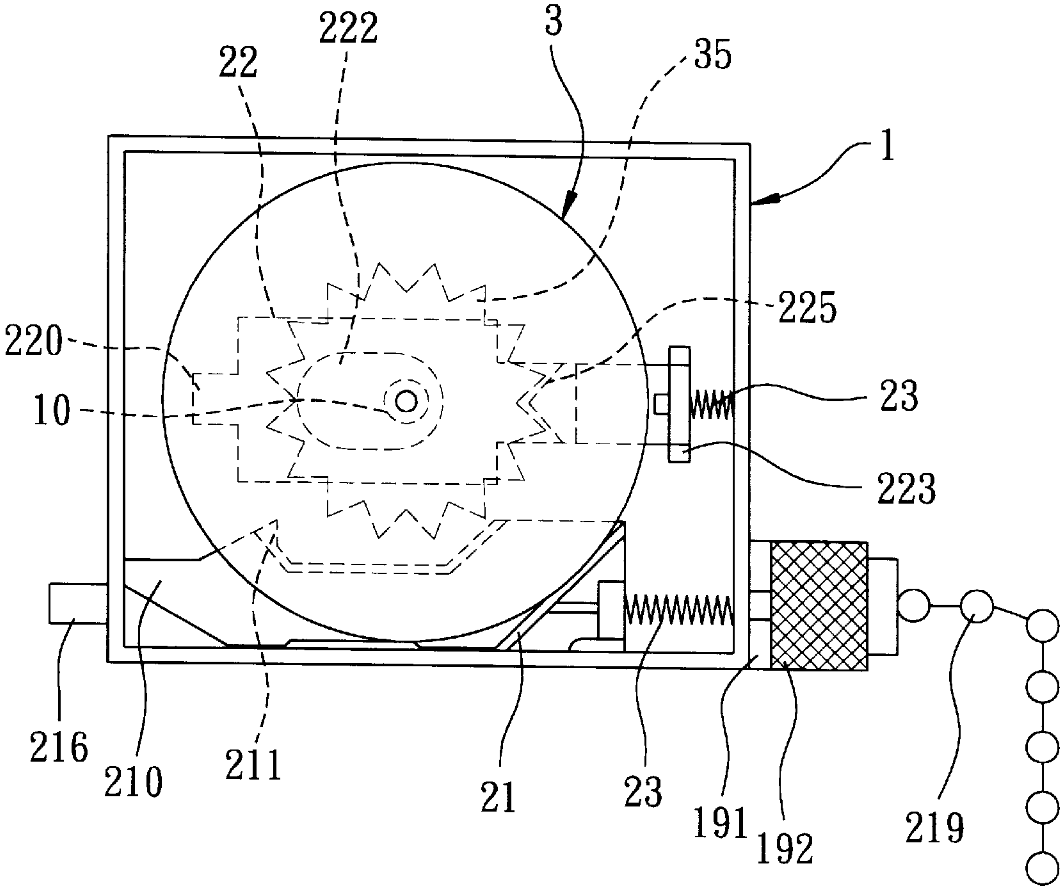
FIG. 5 is a fragmentary top view of the switch of FIG. 1.

FIGS. 1 to 5 illustrate a switch embodying this invention which serves for the purpose of varying the speed of a motor of an electric fan. The switch includes a casing 1, a rotary member 3, a driving member, a guide plate 22, and a switching electrical circuit 4.

The casing 1 is a substantially rectangular box which opens downwardly and which confines a receiving space. A central positioning post 10 projects into the receiving space from a central part of an inner face of the casing 1, and has a restricted welding tip 101. Four spaced apart first stud pieces 11 project into the receiving space from the inner face of the casing 1 at the right side of the central positioning post 10. The casing 1 further has a transverse rectangular plate disposed at the left side of the central positioning post 10 with a first positioning hole 12 formed therein, a first positioning post 14 disposed adjacent to the first stud pieces 11 and projecting into the receiving space from a first side wall of the casing 1, an elongated slot 15 formed in the inner face of the casing 1, a second stud piece 11A projecting therefrom and aligned with the slot 15, a second positioning post 14A aligned with the slot and projecting into the receiving space from the first side wall of the casing 1, a second positioning hole 16 formed in a second side wall of the casing 1 and opposite to the second positioning post 14A, four mounting posts 17 spaced along the periphery of the casing 1 and projecting outwardly of the receiving space in the casing 1, a pair of parallel bars projecting from an outer face of the casing 1 and connected to a threaded first cylindrical half 18 which projects outwardly from the first side wall, a cover 19 mounted on the bars to confine an inner space and connected to a threaded second cylindrical half 190 which is coupled to the first cylindrical half 18, and a nut member 192 which is used to hold the first and second cylindrical halves 18, 190 together. The slot 15 is disposed between the bars. A positioning seat is disposed adjacent to and is aligned with the slot 15, and has a pair of spaced apart guide plates 171 and a partitioning block disposed between the guide plates 171 for receiving a pair of spaced apart first conductive connecting pieces 172 which form a gap therebetween. The gap has a flared end. One of the first conductive connecting pieces 172 is connected to a wire line of a power supply (not shown). A pair of first and second compression springs 23 are respectively sleeved around the first and second positioning posts 14, 14A.

The rotary member 3 is mounted rotatably on the inner face inside the receiving space in the casing 1, and has a disc 30, a hollow central mounting post 34 projecting from the disc 30 into the receiving space in the casing 1 and sleeved rotatably around the central positioning post 10 for rotating about an axis defined by the central positioning post 10, a toothed part 35 surrounding the central mounting post 34, a plurality of welding pins 32 projecting from a bottom side of the disc 30, and four spaced apart F-shaped second conductive connecting pieces 33, each of which has a pair of pin holes 331 for receiving two adjacent ones of the welding pins 32. The welding pins 32 are made of plastic material, and are welded to the second conductive connecting pieces 33. The toothed part 35 includes a plurality of teeth and a plurality of grooves formed respectively between two adjacent ones of the teeth.

Figure 6:
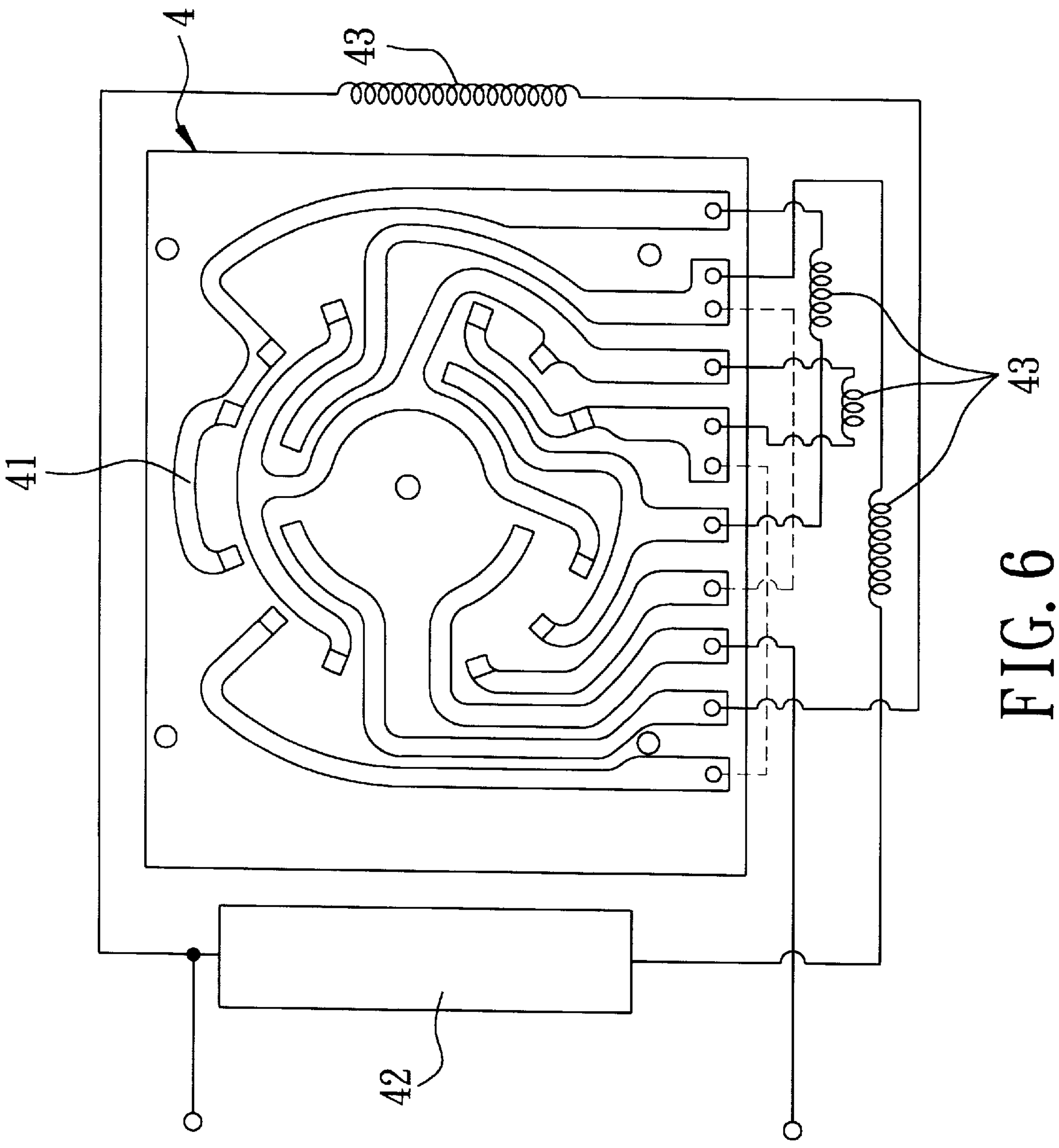
FIG. 6 shows one of a plurality of combinations of electrical connections of an electrical circuit board with a plurality of coils of the switch of FIG. 1.
Figure 7:
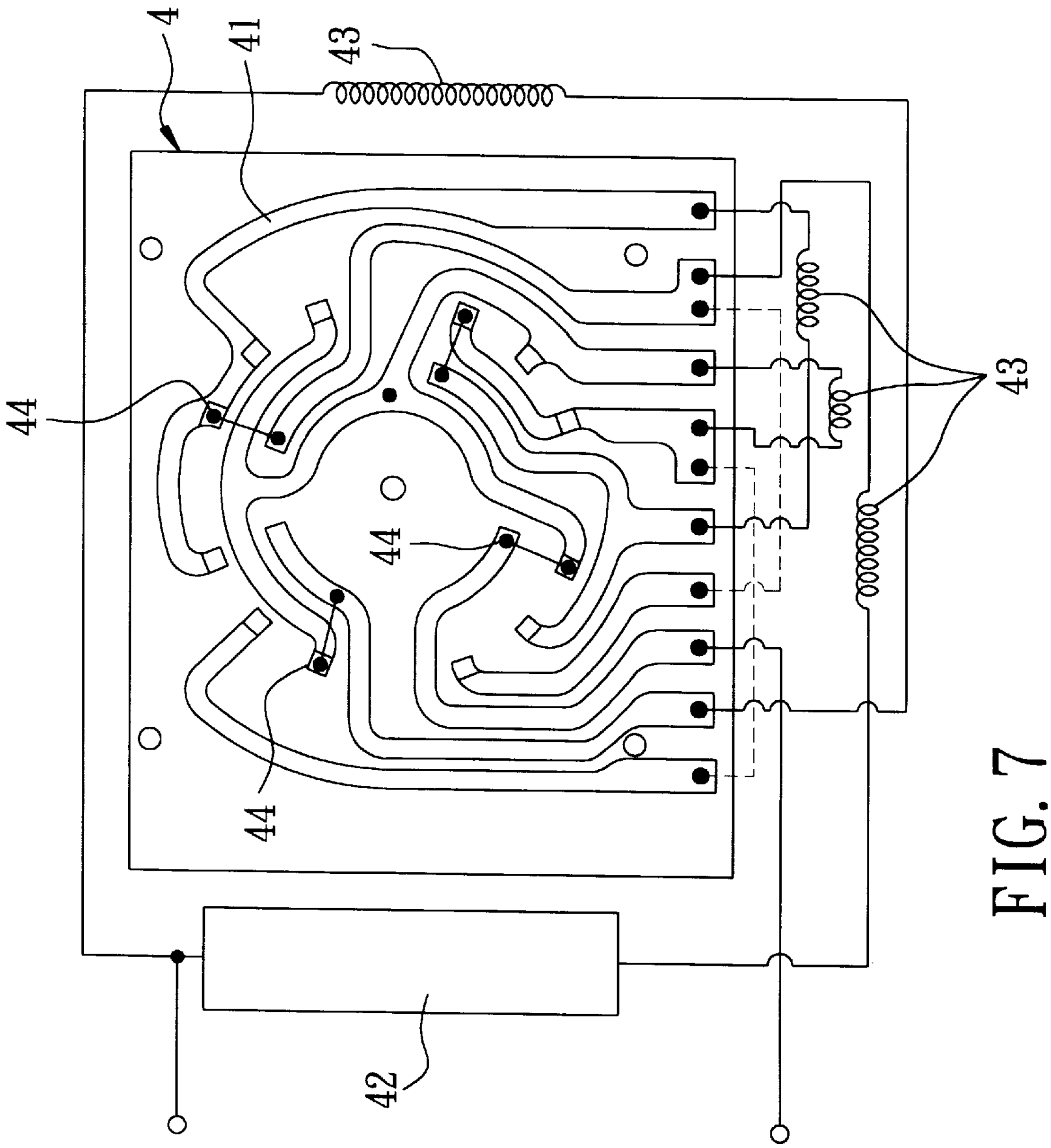
FIG. 7 shows another one of the combinations of electrical connections of the electrical circuit board with the coils of the switch of FIG. 1.
Figure 8:
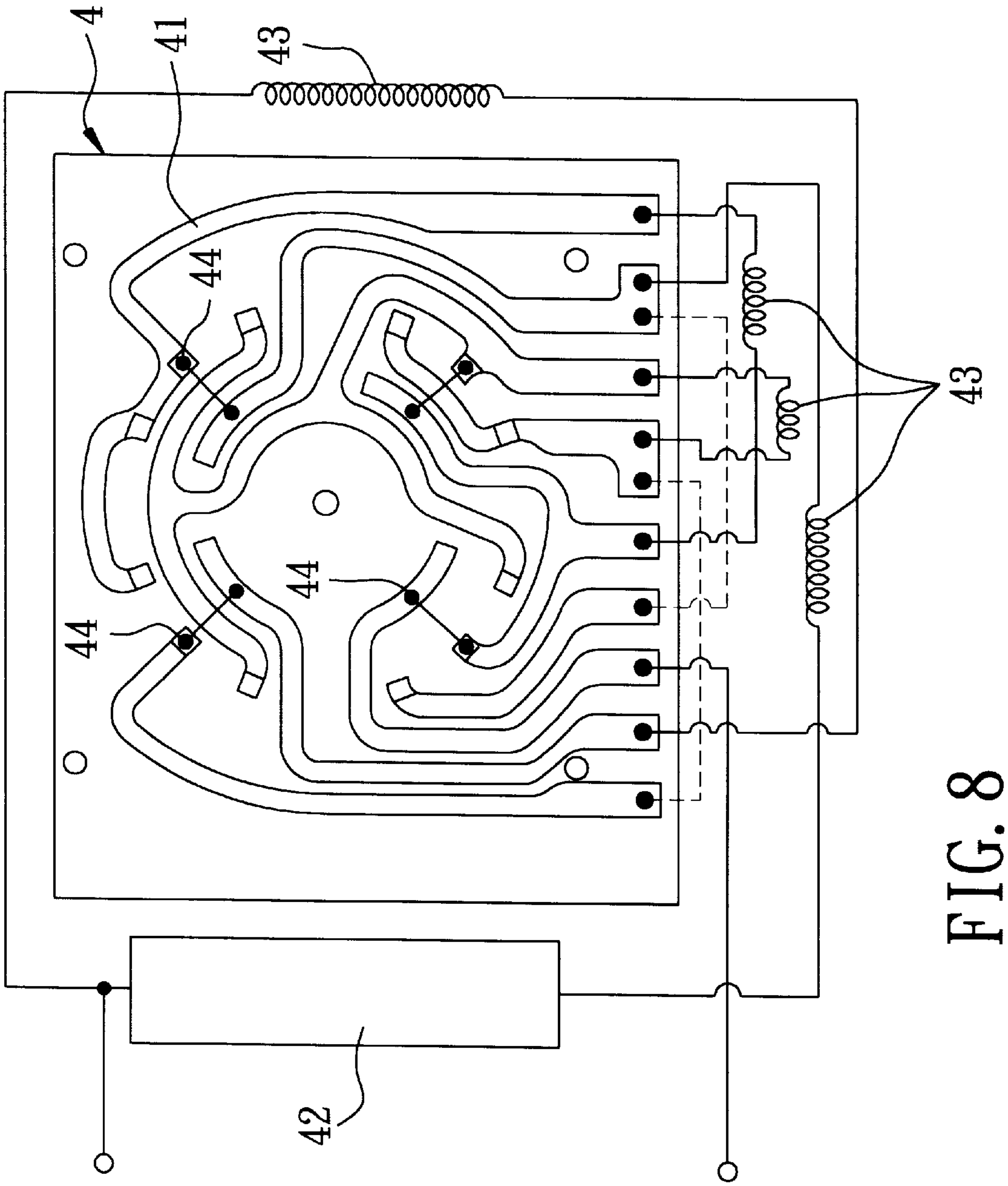
FIG. 8 shows yet another one of the combinations of electrical connections of the electrical circuit board with the coils of the switch of FIG. 1.
Figure 9:
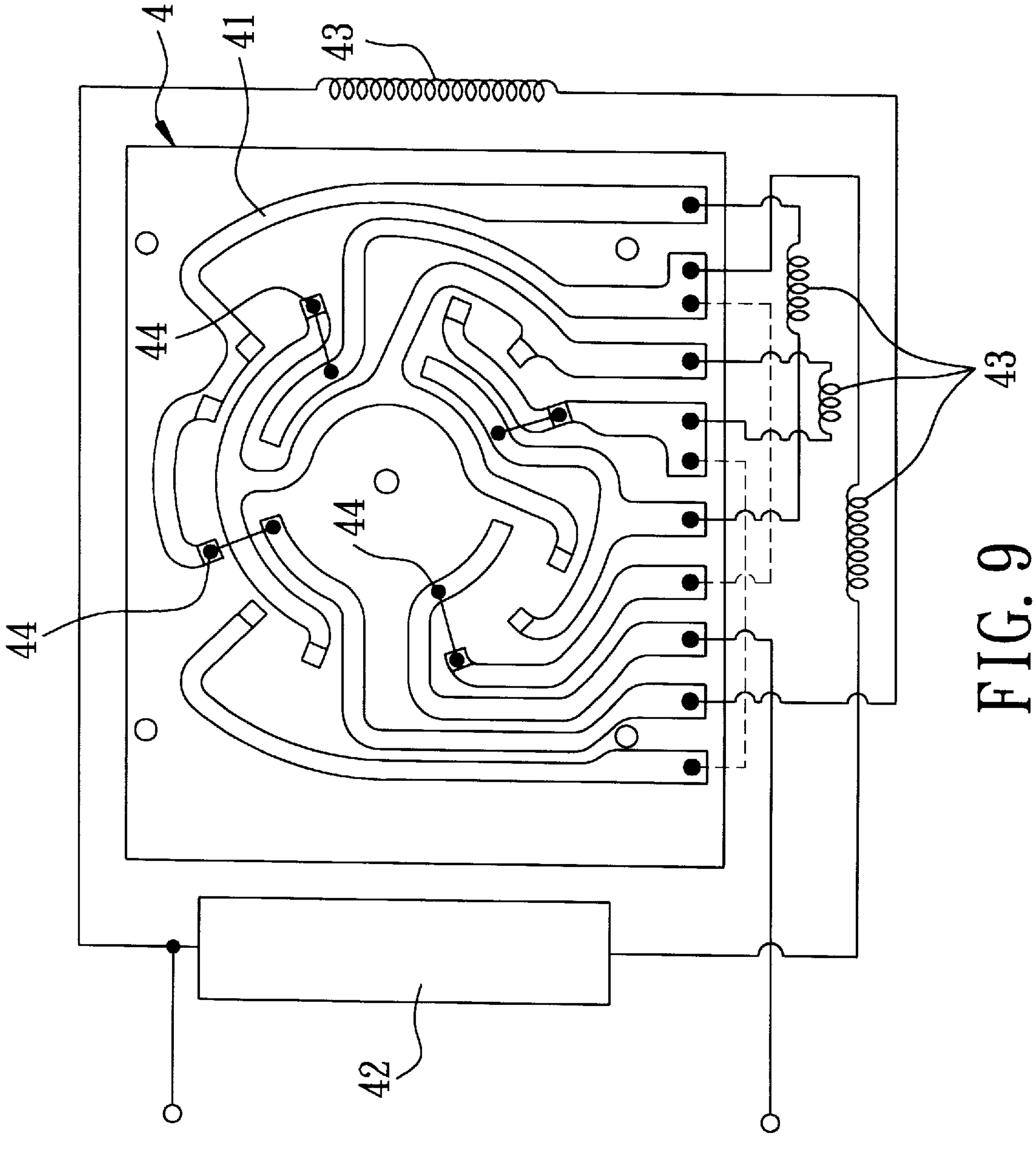
FIG. 9 shows a further one of the combinations of electrical connections of the electrical circuit board with the coils of the switch of FIG. 1.

The switching electrical circuit board 4 includes a plurality of spaced apart conductive traces 41 connected to a plurality of coils 43 and a capacitor 42 (see FIG. 6) of the induction motor (not shown). The second conductive connecting pieces 33 bridge selectively the conductive traces 41 by turning the rotary member 3 about the axis of the central positioning post 10. The other one of the first conductive connecting pieces 172 is connected to the conductive traces 41. The switching electrical circuit board 4 can thus be connected to the power supply when the first conductive connecting pieces 172 are bridged together so that a circuit that passes through the conductive traces 41, the coils 43 and the capacitor 42 can be established. The rotation of the rotary member 3 varies the points of contact of the second conductive connecting pieces 33 on the conductive traces 41 of the electrical circuit board 4, thereby resulting in a plurality of possible combinations of electrical connections of the conductive traces 41, the coils 43 and the capacitor 42. FIGS. 7 to 9 illustrate these combinations which correspond respectively to different speeds of the induction motor. Noted that the black circular dots 44 shown in FIGS. 7 to 9 represent the points of contact of the second conductive connecting pieces 33 on the conductive traces 41. The mounting posts 17 are made of plastic material, and are welded to the electrical circuit board 4.

The driving member includes upper and lower driving plates 214, 21, and a bead chain 219. The lower driving plate 21 is mounted movably on the inner face inside the receiving space in the casing 1, and includes a reduced end 216 projecting into the second positioning hole 16, a recessed end 218 opposite to the reduced end 216 and abutting against the second compression spring 23, a forked protrusion 212 disposed between the reduced end 216 and the recessed end 218 and having a forked end 213 projecting through the slot 15 into the inner space in the cover 19, an oblong slot 217 formed between the protrusion 212 and the recessed end 218 for receiving the second stud piece 11A, and a tongue 211 projecting laterally therefrom toward the toothed part 35 of the rotary member 3. The upper driving plate 214 is laid slidingly on the slot 15 within the inner space in the cover 19, and has a pair of through-holes 214A for receiving the forked end 213 of the protrusion 212 which is made of plastic material, and which is welded to the upper driving plate 214. The upper driving plate 214 has an arm portion 214B projecting from one end into the inner space in the cover 19, and a V-shaped third conductive connecting piece 214C which projects from the other end into the inner space in the cover 19 for moving into the flared end of the gap to bridge together the first conductive connecting pieces 172. The bead chain 219 has one end secured to the arm portion 214B of the upper driving plate 214, and the other end passing through the inner space in the cover 19 and the nut 192 for moving the upper and lower driving plate 214, 21 along the slot 15. The driving member is movable along the slot 15 between a first position (see FIG. 4), in which the third conductive connecting piece 214C moves into the flared gap and interconnects the first conductive connecting piece 172 to permit the conductive traces 41 of the electrical circuit board 4 to be connected to the power supply, and a second position (see FIG. 3), in which the third conductive connecting piece 214C moves away from and disconnects the first conductive connecting pieces 172 so as to disconnect the conductive traces 41 from the power supply. The tongue 211 of the lower driving plate 21 engages the toothed part 35 of the rotary member 3, and turns the rotary member 3 a pitch of the toothed part 35 each time the driving member moves from the first position to the second position. The second compression spring 23 urges the driving member to move from the second position to the first position when the bead chain 219 is released. It is noted that the tongue 211 will slide over the groove face of the respective groove in the toothed part 35, and will not turn the rotary member 3 when moving from the second position to the first position. The upper driving plate 214 can be made of a conductive material. As such, an insulative cover 215 is needed to cover the arm portion 214B of the upper driving plate 214, and the bead chain 219 is secured to the insulative cover 215.

The guide plate 22 is mounted movably in the receiving space in the casing 1, and includes a reduced end 220 projecting into the first positioning hole 12, a recessed end 223 extending through and limited by the first stud pieces 11 and abutting against the first compression spring 23, an oblong opening 222 for receiving the central mounting post 34, and a V-shaped protrusion 225 disposed between the oblong opening 222 and the recessed end 223 and projecting downwardly from a bottom side thereof to engage selectively one of the grooves of the toothed part 35. The first compression spring 23 permits the guide plate 22 to move to and fro each time the rotary member 3 turns a pitch of the toothed part 35.

The driving member is immediately moved from the first position to the second position when a pulling action of the bead chain 219 is operated, thereby temporarily interrupting current flow through the second conductive connecting pieces 33, the conductive traces 41, the capacitor 42 and the coils 43, and thereby temporarily disconnecting the electrical circuit board 4 from the power supply during the course of movement of the second conductive connecting pieces 33 on the conductive traces 41 of the electrical circuit board 4, i.e., changing the induction motor from one speed to another speed. As a consequence, the formation of an electrical arc between the second conductive connecting pieces 33 and the conductive traces 41, and the presence of a non-uniform magnetic line distribution between the coils 43 can be eliminated.

With the invention thus explained, it is apparent that various modifications and variations can be made without departing from the spirit of the present invention. It is therefore intended that the invention be limited only as recited in the appended claims.

I claim:

1. A switch for a variable-speed induction motor, comprising:

a casing having a pair of spaced apart first conductive connecting pieces, one of said first conductive connecting pieces being adapted to be connected to a power supply;

a rotary member disposed below and mounted rotatably on said casing for turning about an axis, and having a toothed part, and a plurality of spaced apart second conductive connecting pieces secured to a bottom side thereof;

a switching electrical circuit adapted to be connected to the induction motor, disposed below said second conductive connecting pieces, and having a plurality of spaced apart conductive traces connected to the other one of said first conductive connecting pieces, said second conductive connecting pieces selectively bridging said conductive traces by turning said rotary member about said axis to obtain a plurality of combinations of electrical connections for the switching electrical circuit to vary the speed of the induction motor;

a driving member mounted movably on said casing, and having a third conductive connecting piece projecting toward said first conductive connecting pieces, and a tongue projecting toward said toothed part, said driving member being movable between a first position, in which said third conductive connecting piece interconnects said first conductive connecting pieces to permit said switching electrical circuit to be connected electrically to the power supply, and a second position, in which said third conductive connecting piece disconnects said first conductive connecting pieces, thereby disconnecting said switching electrical circuit from the power supply, said tongue engaging said toothed part and turning said rotary member a pitch of said toothed part each time when said driving member moves from said first position to said second position; and an urging unit for urging said driving member to move from said second position to said first position.

2. The switch of claim 1, wherein said toothed part has a plurality of teeth and a plurality of grooves formed respectively between two adjacent ones of said teeth, said switch further comprising a compression spring and a guide plate mounted movably on a bottom side of said casing and having a V-shaped protrusion engaging selectively one of said grooves, said compression spring abutting against said casing and said guide plate to permit said guide plate to move to and fro each time said rotary member turns a pitch of said toothed part.

3. The switch of claim 1, wherein said casing has a slot formed therein adjacent to said first conductive connecting pieces, said driving member including an upper driving plate disposed on a top side of said casing and formed with a pair of through-holes, and a lower driving plate disposed on a bottom side of said casing and having a forked protrusion projecting through said slot and said through-holes in said upper driving plate so that said driving member is movable along said slot in said casing, said third conductive connecting piece projecting from said upper driving plate to move to said first conductive connecting pieces in said first position of said driving member, said tongue projecting from said lower driving plate to move to said toothed part in said first position of said driving member.

* * * * *